United States Patent

Okauchi et al.

[11] Patent Number: 5,537,883
[45] Date of Patent: *Jul. 23, 1996

[54] PIEZOELECTRIC PRESSURE SENSOR AND METHOD OF MANUFACTURING THE SAME

[75] Inventors: Tohru Okauchi, Katano; Hiroki Kusakabe, Osaka; Masuo Takigawa, Ikoma, all of Japan

[73] Assignee: Matsushita Electric Industrial Co., Ltd., Japan

[*] Notice: The term of this patent shall not extend beyond the expiration date of Pat. No. 5,377,547.

[21] Appl. No.: 286,469

[22] Filed: Aug. 5, 1994

[30] Foreign Application Priority Data

Aug. 5, 1993 [JP] Japan .................................. 5-194609
Oct. 14, 1993 [JP] Japan .................................. 5-257109

[51] Int. Cl.$^6$ .......................................................... G01L 9/08
[52] U.S. Cl. ................................. 73/723; 73/708; 73/745; 29/25.35
[58] Field of Search ............................... 73/702, 717, 727, 73/745, DIG. 4, 723; 29/25.35; 310/338

[56] References Cited

U.S. PATENT DOCUMENTS

| | | | |
|---|---|---|---|
| 3,150,274 | 9/1964 | Pischinger | 310/8.9 |
| 3,960,018 | 6/1976 | Change et al. | 73/398 R |
| 4,413,509 | 11/1983 | Moser et al. | 73/117.3 |
| 4,463,596 | 8/1984 | Masamitsu | 73/35 |
| 4,637,553 | 1/1987 | Kushida et al. | 239/553.4 |
| 4,979,275 | 12/1990 | Sakaida et al. | 29/29.35 |
| 5,126,617 | 9/1992 | Lukasiewicz et al. | 310/338 |
| 5,377,547 | 1/1995 | Kusakabe et al. | 73/723 |

FOREIGN PATENT DOCUMENTS

| | | |
|---|---|---|
| 0392486 | 10/1990 | European Pat. Off. . |
| 0430445 | 6/1991 | European Pat. Off. . |
| 0549346 | 6/1993 | European Pat. Off. . |
| 0574046 | 12/1993 | European Pat. Off. . |
| 0593889 | 7/1994 | European Pat. Off. . |
| 3026617 | 2/1981 | Germany . |

Primary Examiner—Richard Chilcot
Assistant Examiner—Paul D. Amrozowicz
Attorney, Agent, or Firm—Beveridge, DeGrandi, Weilacher & Young

[57] ABSTRACT

A sensor for detecting the combustion pressure of an engine, in which an upper fixing member and a casing are fixed while a pre-load is being applied to the upper fixing member, so that a pre-load may be applied to a piezoelectric element. Moreover, a tubular diaphragm for transforming a pressure into a strain and a pressure receiving face for receiving the combustion pressure are connected to each other through a plunger so that they may be kept away from each other.

6 Claims, 11 Drawing Sheets

Cylinder head

Burner

Burning pressure

Cylinder head

Burner

Burning pressure

PIEZOELECTRIC PRESSURE SENSOR AND METHOD OF MANUFACTURING THE SAME

BACKGROUND OF THE INVENTION

1. Field of the Invention

The present invention relates to a piezoelectric pressure sensor suited for detecting a pressure such as a combustion pressure in a cylinder of an internal combustion engine.

2. Description of the Prior Art

The piezoelectric pressure sensor making use of a piezoelectric effect for providing an electricity by applying a stress is widely used in the prior art. Especially, there has been developed a pressure sensor which is suited for detecting the combustion pressure in a cylinder of an internal combustion engine by using a tubular diaphragm. FIG. 1 shows a basic construction of a piezoelectric pressure sensor which is used in the internal combustion engine of the prior art using the tubular diaphragm. FIG. 1 presents a longitudinal section of the sensor which is equipped with a casing having a dual structure. In an inner casing 28, there are disposed a pressure transmission member 29 and a piezoelectric element 27 which are fixed on a base 31 by the fixing force of an upper fixing screw 23. The compression applied to the piezoelectric element 27 by the upper fixing screw is called the "pre-load". This pre-load is essential not only for fixing the piezoelectric element 27 and the pressure transmission member 29 but also for stabilizing the establishment of electricity of the piezoelectric element 27 and for metering the vacuum at a suction stroke of the engine. In the case, however, where the pre-load is applied by the screw, it is difficult to hold the pre-load constant among a plurality of sensors due to dispersions in the surface roughness of screw faces, in the back-lashes of screw portional and in the frictions of screw faces, so that the sensitivities of the individual sensors disperse.

SUMMARY OF THE INVENTION

An object of the present invention is to provide a piezoelectric pressure sensor having little dispersion among the sensors.

Another object of the present invention is to provide a piezoelectric pressure sensor which has not only little dispersion among the sensors but also such a slender leading end that it can be easily mounted on an engine having a small displacement.

Still another object of the present invention is to provide a method of manufacturing a piezoelectric pressure sensor having little dispersion among the sensors.

A further object of the present invention is to provide a small-sized piezoelectric pressure sensor which is hardly erroneous in the pressure detection due to the thermal influence from the combustion chamber.

A further object of the present invention is to provide a method of manufacturing a piezoelectric pressure sensor which is hardly erroneous in the pressure detection due to the thermal influence from the combustion chamber.

In order to achieve the first-named object, according to the present invention, there is provided a structure in which the upper fixing member and the inner casing are fixed while a compressive load in the axial direction is being applied to the upper fixing member, so that the compressive load may be applied to the piezoelectric element and the pressure transmission member.

In order to achieve the second-named object, according to the present invention, there is provided a structure in which a mounting portion for mounting the sensor on the engine is formed at the side opposed to the piezoelectric element with respect to the upper fixing member.

In order to achieve the third-named object, according to the present invention, the upper fixing member and the casing are welded while the compressive load toward the piezoelectric element is being applied to the upper fixing member by the pressure head.

In order to achieve the fourth-named object, according to the present invention, there is provided a structure in which the pressure transmission member and the piezoelectric element are arranged in the tubular diaphragm and in which the base mounted on the lower portion of the tubular diaphragm is equipped with a plunger-shaped portion so that the tubular diaphragm is kept away from the pressure receiving face.

In order to achieve the fifth-named object, according to the present invention, a plurality of chucks divided in the axial direction of the tubular diaphragm are placed to cover the outer side face of the tubular diaphragm. In addition, the upper portion of the tubular diaphragm and the upper fixing member are welded to each other while the compressive load applied to the piezoelectric element by the pressure head is being received by the chucks.

Thanks to the structures described above, the distribution of the compressive load to be applied to the piezoelectric element can be made uniform to reduce the dispersion between the sensors. Since, moreover, the compressive load can be directly controlled, the dispersion of the compressive load itself can be suppressed, and the dispersion between the sensors can be reduced.

Furthermore, the sensor can be easily mounted on an engine having a small displacement or multiple valves, because of a small dispersion between the sensors and because of a thinned leading end of each sensor. At the assembling time, the pressure transmission member and the piezoelectric element need not be tentatively held so that the number of assembling steps is decreased, and the high compressive load prevents the upper fixing member from any inclination so that no simultaneous multi-spot welding operation is required. As a result, a single welding head and a single-function welder can be sufficiently used to facilitate the manufacture and the mass-production thereby to lower the price for the sensor. Furthermore, since the influence of the heat upon the tubular diaphragm from the combustion chamber is reduced, the pressure detection error can be suppressed to about 1% to ensure a highly accurate pressure detection even if the change in the temperature inside of the combustion chamber is the maximum. Furthermore, even this highly accurate piezoelectric pressure sensor can be easily manufactured to provide a highly accurate pressure sensor at a reasonable price.

DESCRIPTION OF THE PREFERRED EMBODIMENTS

A first embodiment of the piezoelectric pressure sensor will be described in the following with reference to the accompanying drawings.

Figure 2:
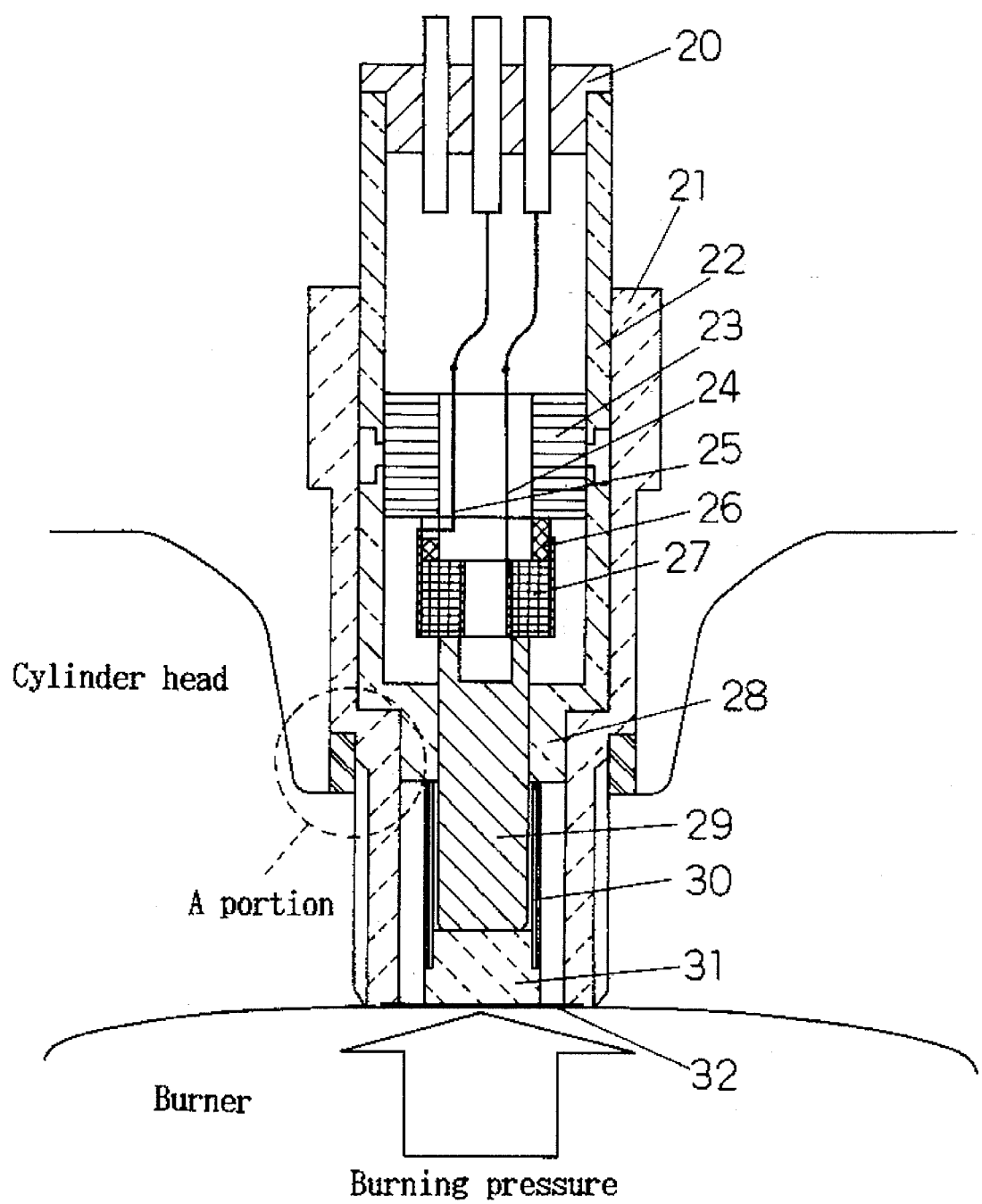
FIG. 2 is a longitudinal section showing the state in which a piezoelectric pressure sensor according to a first embodiment of the present invention is mounted in the cylinder head of an engine.

FIG. 2 is a longitudinal section of a piezoelectric pressure sensor (as will be shortly referred to as the "sensor") according to a first embodiment of the present invention and shows the state in which the sensor is mounted in a cylinder head. As shown in FIG. 2, the sensor has a dual structure composed of an outer casing 21 and an inner casing. This inner casing is further composed of two portions, i.e., a first inner casing 22 and a second inner casing 28. To the lower portion of the second inner casing 28, there is fixed a tubular diaphragm 30 which has its leading end fitted in a base 31. On the upper face of the base 31, there is mounted a pressure transmission member 29 which is made of ceramics. On the upper portion of the pressure transmission member 29, there is mounted a piezoelectric element 27. This piezoelectric element 27 is formed into a cylindrical shape having electrodes at its outer and inner circumferences and is polarized in the axial direction. An outer electrode lead-out element 25 is mounted on the outer circumference of the piezoelectric element 27, and an inner electrode lead-out element 24 is mounted in the inner circumference of the same. To the outer and inner electrode lead-out elements 25 and 24, moreover, there are connected individual lead wires which are connected with a connector 20. Over the piezoelectric element 27, there is disposed an upper fixing member 23 which is welded to the second inner casing 28. Between the upper fixing member 23 and the piezoelectric element 27, there is sandwiched an insulating ring 26 of alumina for insulating the upper fixing member 23 from the piezoelectric element 27 and the outer electrode lead-out element 25. The upper fixing member 23 and the second inner casing 28 are fixed together by welding them using a YAG laser while the upper fixing member 23 is pre-loaded. This pre-load is a compressive load which is directed to push the upper fixing member 23 into the second inner casing 28.

Specifically, this pre-load has the following three major functions: (1) to improve the contact between the pressure transmission member 29 or the insulating ring 26 and the piezoelectric element 27 thereby to stabilize the output of the piezoelectric element 27; (2) to fix the pressure transmission member 29 or the piezoelectric element 27 and the insulating ring 26; and (3) to ensure transmission of such a negative pressure (which is lower than the atmospheric pressure) to the piezoelectric element 27 as is established at a suction stroke in the combustion chamber of the engine.

On the other hand, the pre-load is mostly borne by the axial extension of the tubular diaphragm 30. Thus, this tubular diaphragm 30 uses stainless steel for springs. This is because stainless steel has such a high yield stress even under a high temperature that it is hard to cause a relaxation of stress. The assembly of the inner casing is completed by placing and welding the first inner casing 22 to the upper portion of the upper fixing member 23.

On the other hand, the outer casing 21 has its lower portion threaded to mount the sensor on the engine, and its leading end portion is equipped with a diaphragm 32 for receiving the combustion pressure. Then, the assembled inner casing is inserted into the outer casing 21. The outer casing 21 and inner casing are fixed by fillet-welding the inner side of the upper face of the outer casing 21 to the first inner casing 22.

Moreover, the diaphragm 32 and the base 31 are spot-welded to transmit the pressure received by the diaphragm 32 without fail to the base 31.

Here will be described the actions of the sensor shown in FIG. 2. First of all, the mounting process of the sensor on the engine is described. For this process, there is used the screw portion which is formed in the lower portion of the outer casing 21. As this screw portion is turned, its root A protrudes in the axial direction. Since, however, the outer casing 21 and the second inner casing 28 are given the dual structure, the protrusion of the outer casing 21 will not invite any direction protrusion of the second inner casing 28.

As the outer casing 21 protrudes, the diaphragm 32 has its outer circumferential portion pulled downward. Since, however, the diaphragm 32 is made very thin (to have a thickness of 0.1 mm), the protrusion of the root A of the outer casing 21 is absorbed by the strain of the diaphragm 32 to cause little deformation in the tubular diaphragm 30 and the inner casing. As a result, the pre-load applied to the piezoelectric element 27 hardly changes so that the mounting force of the sensor exerts no influence upon the sensor output.

Here will be described the function to detect the pressure. When the combustion pressure of the engine is applied to the diaphragm 32, it is transmitted through the base 31 to the pressure transmission member 29. At this time, the tubular diaphragm 30 extended by the pre-load contracts according to the combustion pressure so that this pressure is transformed into a strain. The pressure transmission member 29 so transmits the combustion pressure to the piezoelectric element 27 as to lift the inner side of the lower face of the piezoelectric element.

Since, however, the outer side of the upper face of the piezoelectric element 27 is supported through the insulating ring 26 by the upper fixing member 23, a shearing force is established in the piezoelectric element 27. As a result, electricity according to that shearing force is established between the individual electrodes disposed at the inner and outer circumferences of the piezoelectric element 27. The electricity thus established between the electrodes is led out through the inner electrode lead-out element 24 and the outer electrode lead-out element 25 and is transmitted through the lead wires and the connector 20 to an amplifier.

Figure 1:
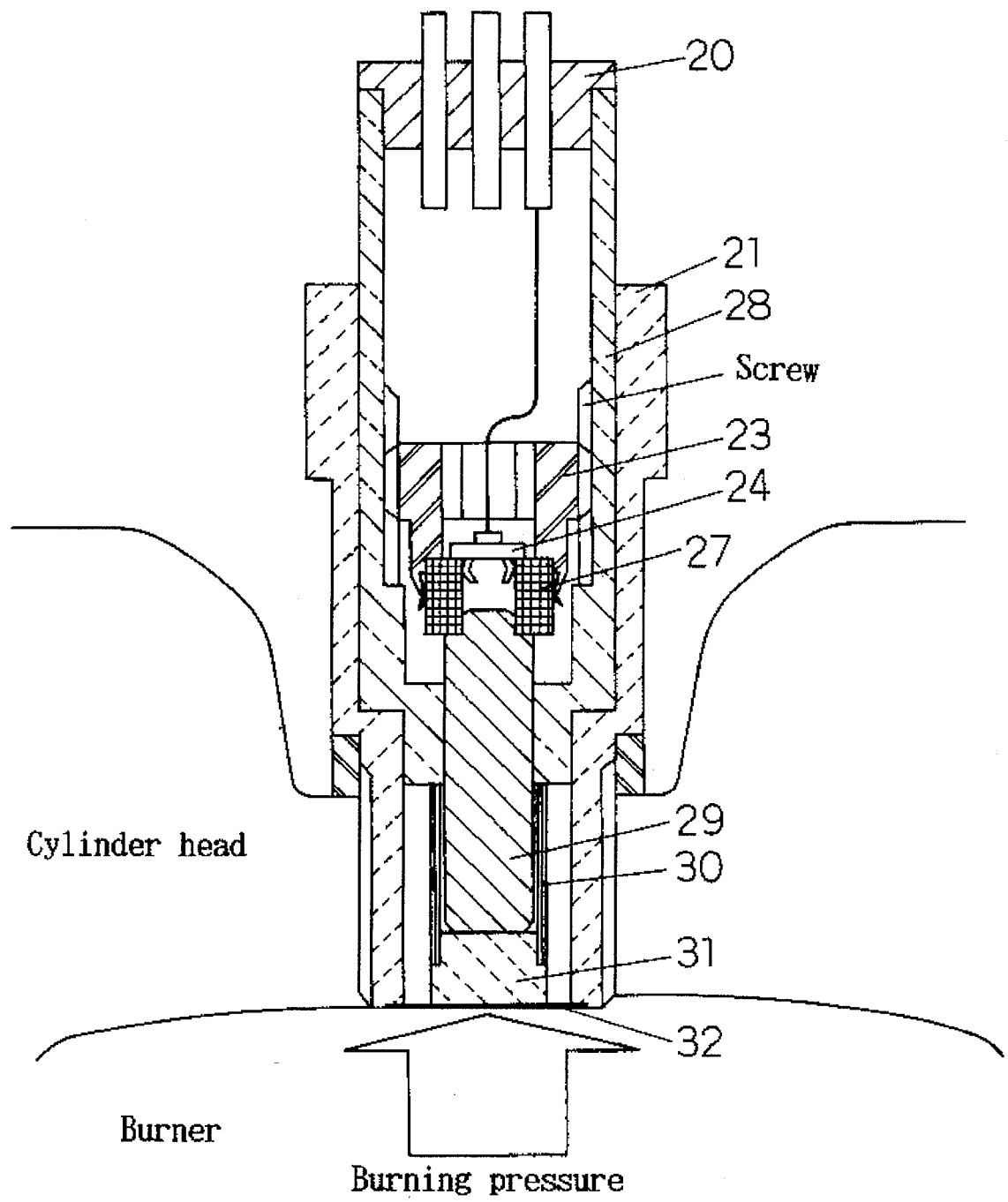
FIG. 1 is a longitudinal section showing the state in which a piezoelectric pressure sensor having a structure of the prior art is mounted in the cylinder head of an engine.

FIG. 1 is a longitudinal section showing the state in which a sensor of the prior art is mounted in the cylinder head of an engine.

What is different from the sensor of FIG. 2 is that the pre-load is applied to the piezoelectric element 27 by using the upper fixing screw 23; that the inner casing 28 is made integral; that the inner electrode lead-out element 24 has a different shape; and that the outer electrode of the piezoelectric element 27 is shorted to the casing through the upper fixing member 23.

Of these differences, the most notable point is how to apply the pre-load. In the prior art, this application of the pre-load to the piezoelectric element 27 is accomplished by fastening the upper fixing screw 23. With the structure of the prior art shown in FIG. 1, too, the characteristics for a single sensor are substantially satisfactory in the linearity, the durability and the outputting stability against heat.

In the case, however, where a plurality of sensors of identical specifications are prepared and compared in their characteristics, the structure of the prior art has a serious dispersion in sensitivity among the sensors to make it difficult to adjust the individual sensitivities of the sensors. This difficulty is caused by the method of controlling the magnitude of the pre-load by adjusting the upper fixing screw 23 and by the torsional force to be applied to the piezoelectric element 27. The control of the magnitude of the pre-load is accomplished by the fastening torque of the upper fixing screw 23. Since, however, the frictional force of the faces of the screw threads changes with their roughness and/or cleanness, the screw has its axial force dispersed even if it is fastened by an equal torque.

As a result, a dispersion is caused in the pre-load to invite a dispersion in the sensitivities of the sensors. As the upper fixing screw 23 is fastened even under a constant pre-load, on the other hand, a slip occurs on the contact faces between the piezoelectric element 27 and the upper fixing screw 23 and on the contact faces with the pressure transmission member 29. This slip causes a serious dispersion in dependence upon the state of the contact faces. As a result, the torsional force to be applied to the piezoelectric element 27 is seriously dispersed by the slip to cause one of the factors to increase the dispersion in the sensor sensitivities. In the construction according to the embodiment of the present invention shown in FIG. 2, on the contrary, the pre-load is applied by pushing the upper fixing member 23 onto the piezoelectric element 27.

Figure 6:
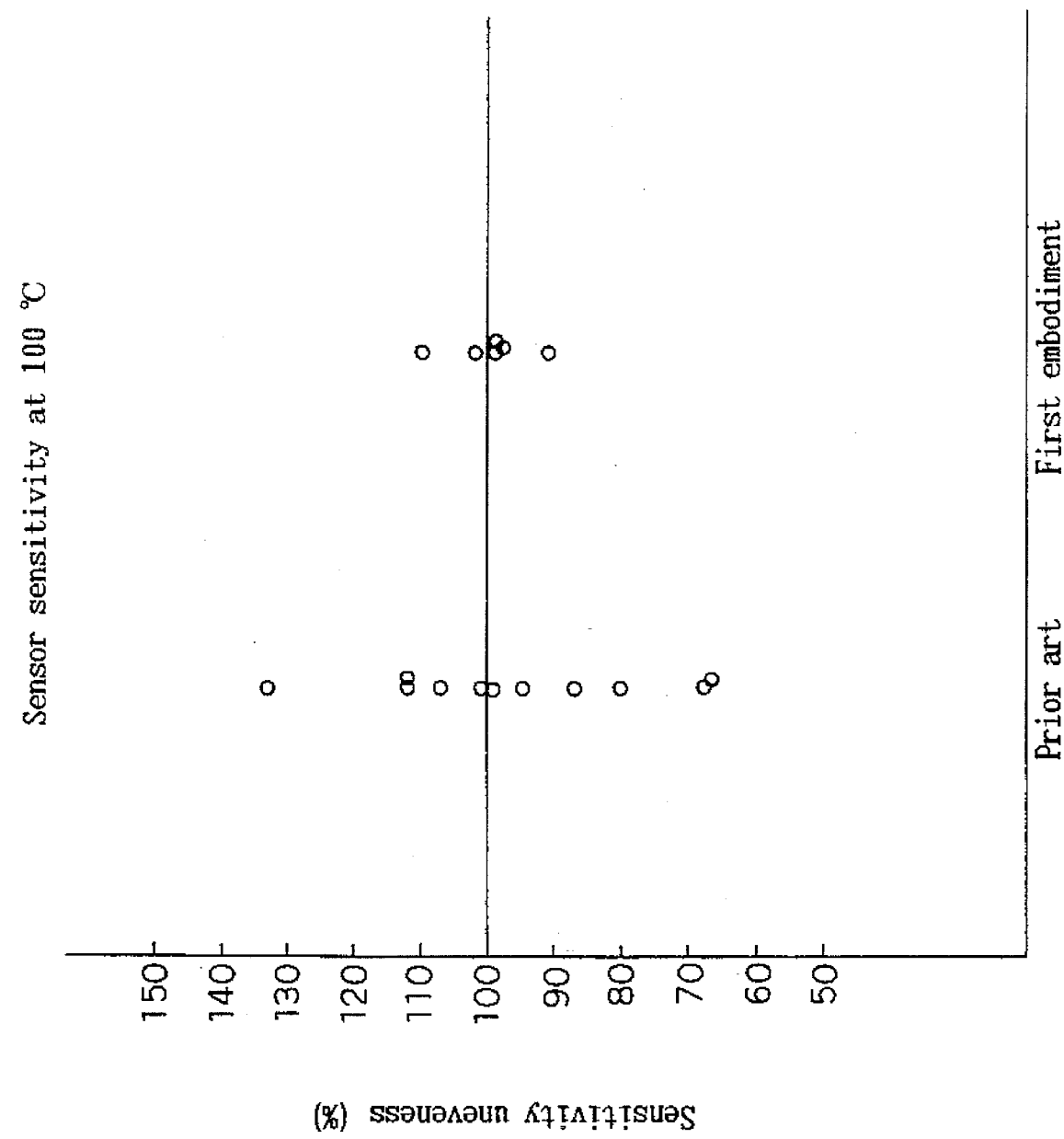
FIG. 6 is a graph comparing the dispersions of sensitivity of the sensor of the structure of the prior art and the sensor according to the first embodiment.

Thus, the pre-load can be applied in a substantially ideal manner because the force to be applied to the piezoelectric element 27 is a simple compression having no torsional force. In the control of the pre-load, too, the compression is directly controlled so that the pre-load can be more accurately controlled to decrease the dispersion of the sensor sensitivities. FIG. 6 presents a comparison in the sensitivity dispersion between the sensor of the prior art structure and the sensor of the present embodiment at an ambient temperature of 100 degree C. As seen from FIG. 6, the structure of the prior art has a sensitivity dispersion of about ±35% with respect to an average whereas the structure of the present embodiment can have its dispersion decreased to ±10%. Thus, by applying the pre-load to the piezoelectric element by the upper fixing member, the sensitivity dispersion among the sensors can be suppressed to facilitate the mass-production. Incidentally, the first inner casing 22 and the upper fixing member 23 are made separate in the embodiment of FIG. 2 but they can be made of an integral part and still provide similar effects.

Moreover, the present embodiment is exemplified by a separate circuit type, in which the charge amplifier is disposed outside of the sensor casing. However, there has also been developed a circuit built-in type sensor which has a circuit board assembled in the sensor casing, to improve the handling property and the noiseless property.

Figure 3:
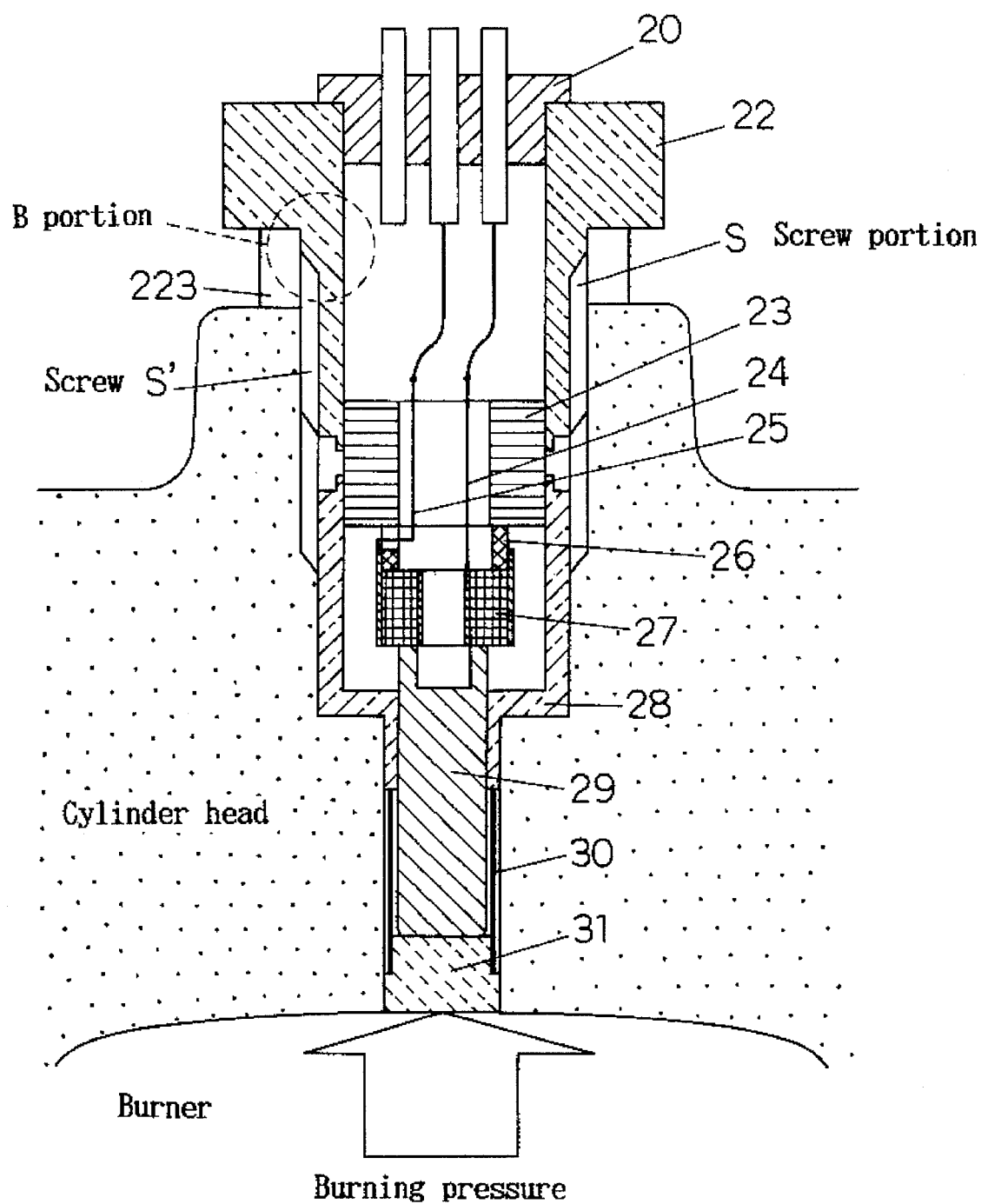
FIG. 3 is a longitudinal section showing the state in which a piezoelectric pressure sensor according to a second embodiment of the present invention is mounted in the cylinder head of an engine.

Here will be described a second embodiment of the present invention with reference to FIG. 3. FIG. 3 is a section showing a state in which a piezoelectric element (as will be shortly referred to as the "sensor") is mounted in the cylinder head of an engine. The sensor, as shown in FIG. 3, has a structure capable of detecting the pressure with only the inner casing portion of the sensor structure shown in FIG. 2. What is different from the structure of FIG. 2 is that the outer casing is eliminated together with the diaphragm at the leading end thereof, and that the screw portion for fastening the sensor in the cylinder head is formed directly in the first casing 22.

Here will be described the actions of the sensor shown in FIG. 3. The combustion pressure of the engine is directly received by the lower face of the base 31 and is so applied through the pressure transmission member 29 to the piezoelectric element 27 as to lift the inner side of the lower face of the piezoelectric element 27. By the combustion pressure applied to the piezoelectric element 27, a shearing force is established in the piezoelectric element 27 so that electricity is established in proportion to the shearing force. A combustion pressure signal is produced by amplifying the electricity. The mechanism for producing the pressure signal from the combustion pressure is absolutely identical to that shown in FIG. 2.

Here will be described the mounting process of the sensor. The sensor is mounted in the cylinder head by fastening a screw portion S formed in the first casing 22. As this screw portion S of the first casing 22 is fastened, its root portion B is protruded upward because a sealing member 223 is interposed. On the other hand, the pre-load applied at the time of assembly is reserved as an extension of the tubular diaphragm 30 so that it remains unchanged unless the distance between the upper fixing member 23 and the base 31 changes. When the sensor is mounted, only the first casing 22 but not the second casing 28 is deformed by the fastening force of the screw portion S. Although the structure of FIG. 3 is made so single as to use no outer casing, it is possible to provide the sensor which will not receive the mounting force. In the case where a pressure sensor of the type having a pressure receiving face exposed to the inside of the combustion chamber is to be mounted by boring the cylinder head directly, the area of the sensor to be exposed to the combustion chamber cannot be enlarged because the intake and exhaust valves occupy a large area in the wall surface of the combustion chamber.

Since no outer casing is used, the sensor having the structure shown in FIG. 3 can have its leading end thinned to realize such a sensor as can be easily mounted in an engine having a small displacement or multiple valves. Incidentally, the embodiment of FIG. 3 is exemplified by making the upper fixing member 23 and the first casing 22 of different parts. However, similar effects could be exhibited even if the first casing 22 were eliminated by forming the upper fixing member 23 with a screw portion for mounting the sensor.

Figure 4:
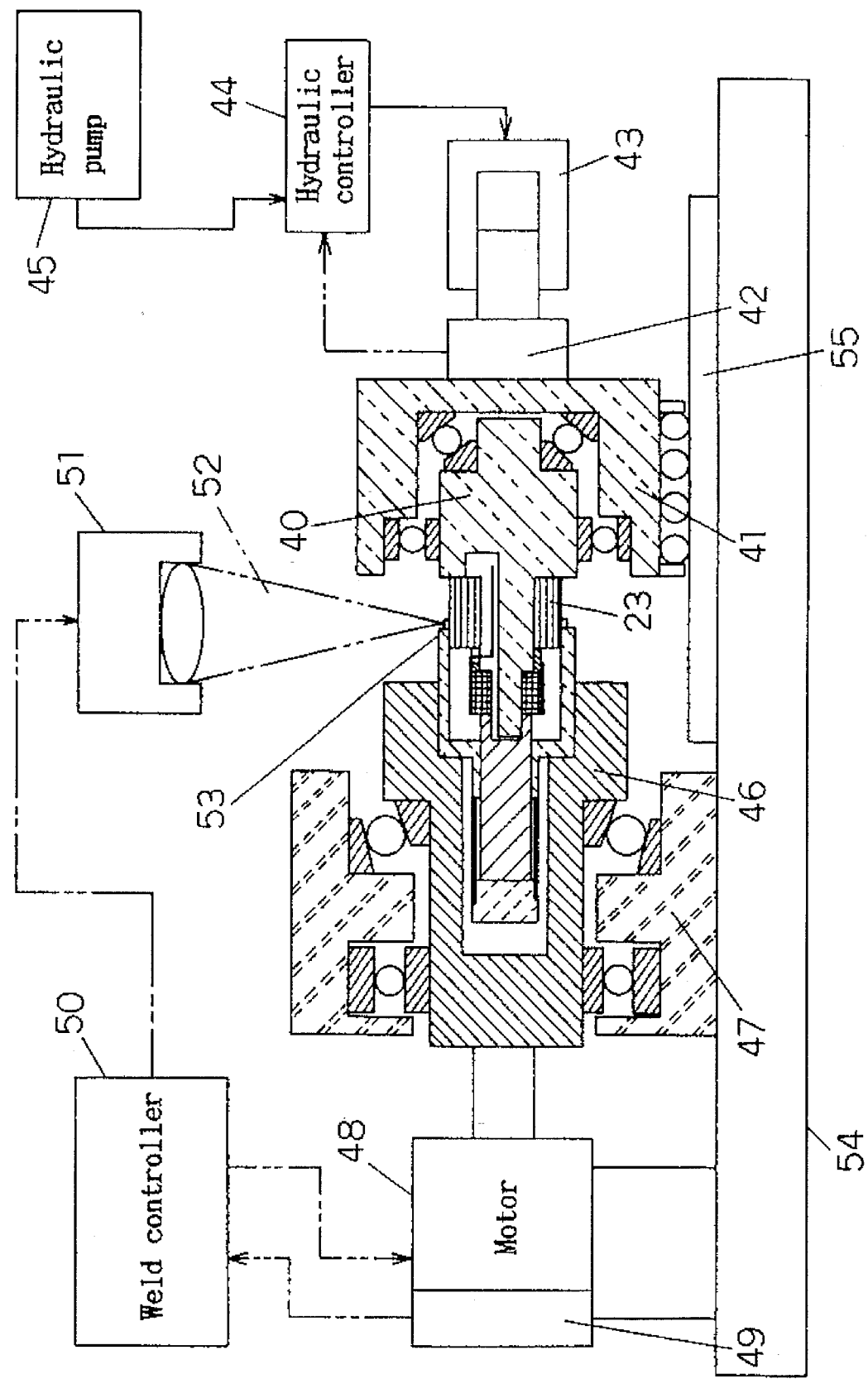
FIG. 4 is a diagram showing the construction of an apparatus for manufacturing a piezoelectric pressure sensor according to the first or second embodiment of the present invention.
Figure 5:
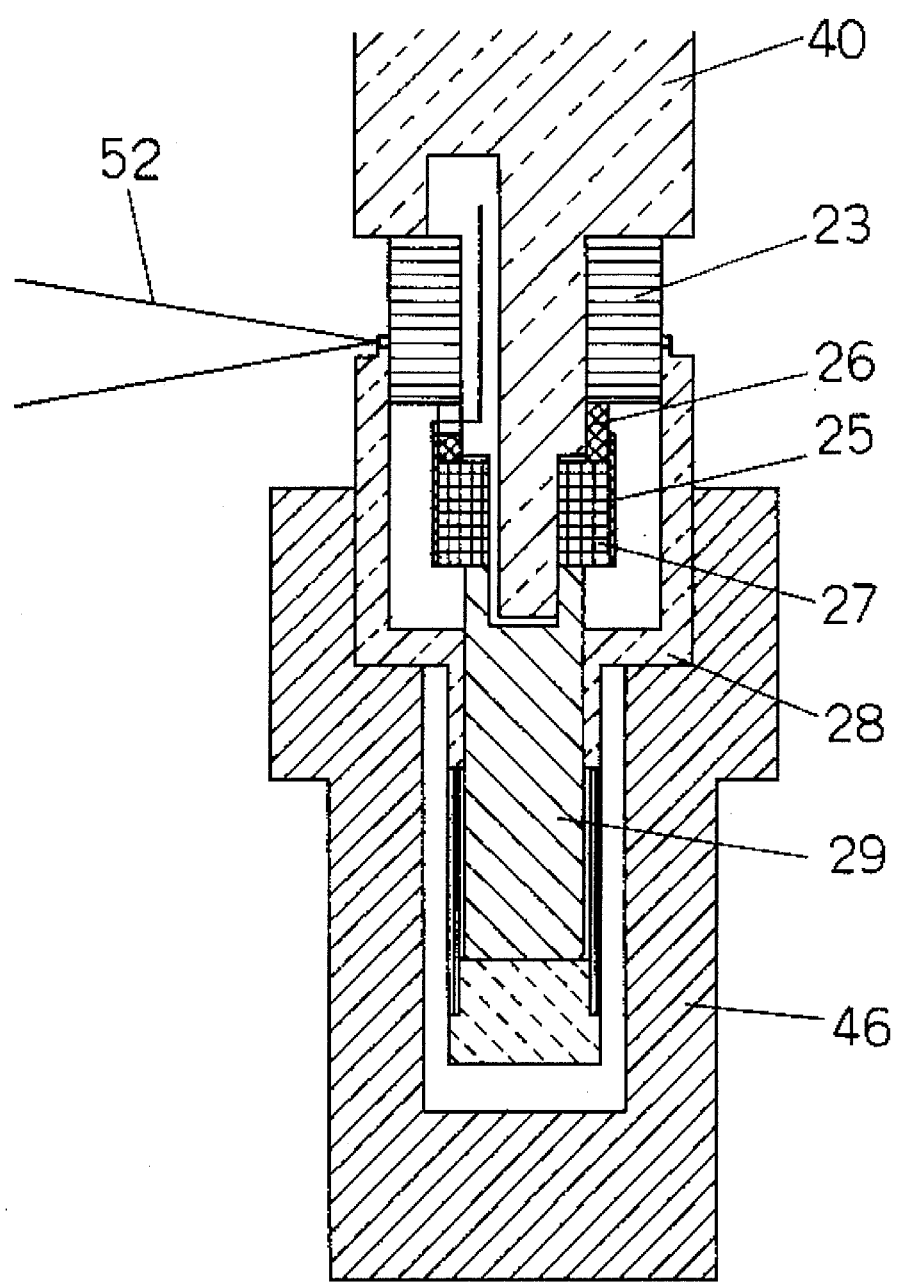
FIG. 5 is a detailed section showing a sensor portion of FIG. 4.

A sensor assembling method according to a third embodiment of the present invention will be described with reference to FIGS. 4 and 5. FIG. 4 shows a method of fixing the upper fixing member 23 in the second casing 28 of the sensor shown in FIG. 3. A sensor being assembled is designated at 53 in FIG. 4. This sensor 53 is held between a holder 46 and a pressure head 40. The holder 46 is held by a second bearing box 47 and is rotated while holding the center axis of the sensor 53 accurately by a motor 48 which is connected to the holder 46. Moreover, the second bearing box 47 is fixed on a base 54.

On the other hand, the pressure head 40 is also so held by a first bearing box 41 that it can accurately rotate on the axis of the sensor 53. Moreover, the first bearing box 41 is so carried by a linear system 55 mounted on the base 54 that it can slide in parallel with the center axis of the sensor 53. As a result, the pressure head 40 can slide in the axial direction while rotating on the center axis of the sensor 53. To the first bearing box 41, there is connected through a load cell 42 a plunger 43 so that the pressure head 40 can hydraulically apply a pre-load in the direction of compression to the sensor 53. This pre-load is detected by the load cell 42 and is fed to a hydraulic controller 44.

On the other hand, the oil pressure to be applied to the plunger 43 is produced by a hydraulic pump 45 and is subjected to a feedback control using the value of the load cell 42 by the hydraulic controller 44. Thus, the sensor 53 is assembled under the pre-load by a laser welder 51. At the time of this welding operation, the head of the laser welder 51 is fixed whereas the sensor 53 to be worked is rotated. This rotation is established by the motor 48, the R.P.M. of which is detected by an encoder 49 and sent to a weld controller 50. This weld controller 50 controls the R.P.M. of the motor 48 to hold the R.P.M. coming from the encoder 49 at a constant value so that the laser welder 51 may be controlled under the optimum welding condition for the R.P.M. of the sensor 53. Here will be described in detail the assembling process of the sensor with reference to FIG. 5 presenting an enlarged diagram of the sensor 53 of FIG. 4. The holder 46 has its inside formed into a stepped recess for supporting the stepped lower face of the second casing 28.

As a result, this second casing 28 is positioned by the inner face of the holder 46. On the other hand, the pressure head 40 has its leading end portion formed into a double-stepped convex shape and fitted in the recess of the pressure transmission member 29 to position the pressure transmission member 29. The piezoelectric element 27 is also positioned by its inner side and the leading end of the pressure head 40. Next, the insulating ring 26 and the upper fixing member 23 are positioned by the second step of the pressure head 40. Since the outer electrode lead-out element 25 has been attached to the piezoelectric element 27 when the upper fixing member 23 is fixed, the pressure head 40 is formed with a relief for the terminals of the outer electrode lead-out element 25. Simultaneously as the preload is thus applied to the upper fixing member 23 by the pressure head 40, the pressure transmission member 29, the piezoelectric element 27, the insulating ring 26 and the upper fixing member 23 can be positioned, and the second casing 28 and the upper fixing member 23 are welded to each other by irradiating the boundary between the second casing 28 and the upper fixing member 23 with the laser beam 52. Since the positioning operation and the welding operation are simultaneously carried out in that way, the internal parts need not be tentatively held by an adhesive or the like, nor arises any displacement between the tentative position and the pressed/welded position so that the preload can be set to a high level. Under this high pre-load, the internal members are firmly positioned during the welding operation so that the upper fixing member 23 can be prevented from any inclination even with the single laser beam 52 for the welding operation. If this welding operation can be carried out with the single laser beam, no balance is required between the laser beams, and the required output of the laser welder may be so low that a remarkably high merit is obtained in the production facilities. Incidentally, the embodiment of FIGS. 4 and 5 has been described on the case in which the sensor shown in FIG. 3 is to be assembled. This assembly can be adopted even for the sensor shown in FIG. 2 merely by modifying the internal shape of the holder slightly.

Here will be described a third embodiment of the present invention with reference to FIG. 7.

Figure 7:
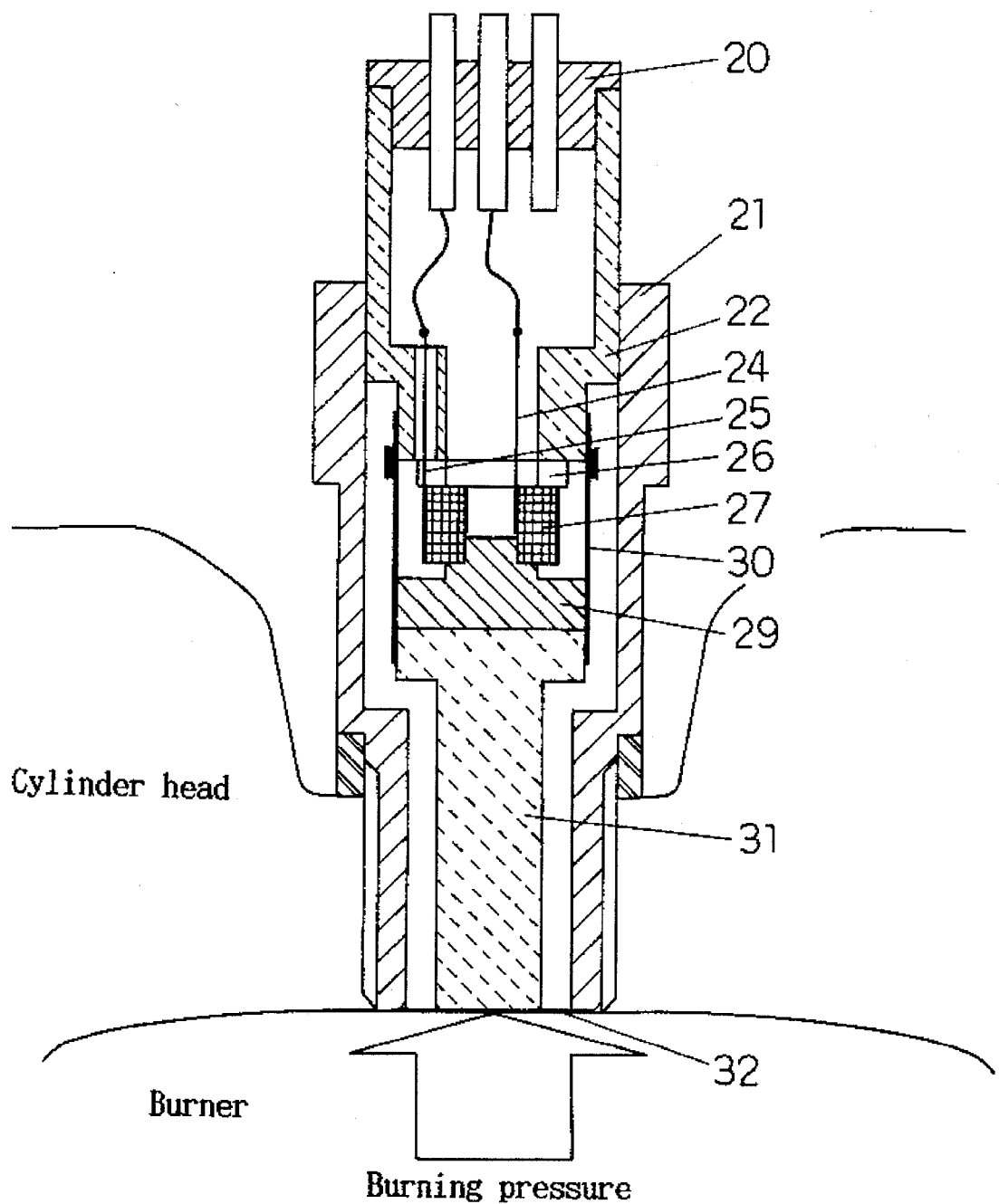
FIG. 7 is a longitudinal section showing the state in which a piezoelectric pressure sensor according to a third embodiment of the present invention is mounted in the cylinder head of an engine.

FIG. 7 is a longitudinal section of a piezoelectric pressure sensor (as will be shortly referred to as the "sensor") according to the third embodiment and shows the state in which the sensor is mounted in the cylinder head of an engine. On the lower portion of the inner casing 22, there is fixed the tubular diaphragm 30 which has a slightly smaller diameter than that of the body portion of the inner casing 22. In the other end of the tubular diaphragm 30, there is disposed the base 31 of a metal, which is rather longer than that (i.e., the base 31 of FIG. 1) of the prior art. By thus using the long base 31, the tubular diaphragm 30 is kept away from the combustion chamber so that the thermal influence of the combustion chamber can be reduced to an extremely low level (of about 1%).

Moreover, the tubular diaphragm 30 has its internal diameter made larger than that (i.e., the tubular diaphragm 30 of FIG. 1) of the prior art so that it accommodates the pressure transmission member 29 of ceramics and the piezoelectric element 27 therein.

Thus, the elongated portion of the base 31 can be absorbed to keep the length of the sensor itself equal to that of the prior art. The piezoelectric element 27 in the tubular diaphragm 30 has a cylindrical shape like that shown in FIG. 2 and is polarized in the axial direction and equipped with electrodes at its outer and inner circumferences. The piezoelectric element 27 has its outer and inner circumferences connected to the outer electrode lead-out element 25 and the inner electrode lead-out element 24, respectively, which are individually connected with the connector 20. On the upper portion of the piezoelectric element 27, there is placed the insulating ring 26 which is made of alumina to insulate the piezoelectric element 27 and the inner casing 22. The inner casing 22 has its lower portion welded, with the piezoelectric element 27 being axially compressed (or pre-loaded), to the upper portion of the tubular diaphragm 30. Moreover, the pre-load applied for fixing the tubular diagram 30 and the inner casing 22 is essential for fixing the individual portions, stabilizing the output and metering the vacuum at the suction stroke.

Here will be described the actions of the sensor of the present embodiment shown in FIG. 7.

In the mechanism shown in FIG. 7, the mechanism for establishing electricity according to the pressure in the piezoelectric element 27 by the combustion pressure of the engine received by the diaphragm 32 is absolutely identical to that of the embodiment of FIG. 2. Specifically, the combustion pressure received by the diaphragm 32 is transmitted through the base 31 and the pressure transmission member 29 to the inner side of the lower face of the piezoelectric element 27. Then, a shearing force is established in the piezoelectric element 27 so that electricity according to the shearing force is built up.

Incidentally, the present embodiment is exemplified by the separate circuit type in which the charge amplifier is disposed outside of the sensor casing. However, there is developed the circuit built-in type sensor in which the circuit board is built in the sensor casing to improve the handling property and the noiseless property.

Here will be described the effect which is obtained from the construction in which the tubular diaphragm 30 is kept away from the combustion chamber.

First of all, an experimenting method will be described in the following. To a common cylinder of a four-cycle four-cylinder gasoline engine, there are attached a water-cooled reference pressure sensor and a sensor according to one of the embodiments. The outputs of these two sensors are concurrently metered over continuing forty engine cycles. Also, the output of the reference sensor is subtracted from the output of the sensor of the embodiment so that the detection error of the pressure of the sensor of the embodiment is determined from the difference.

Figure 10:
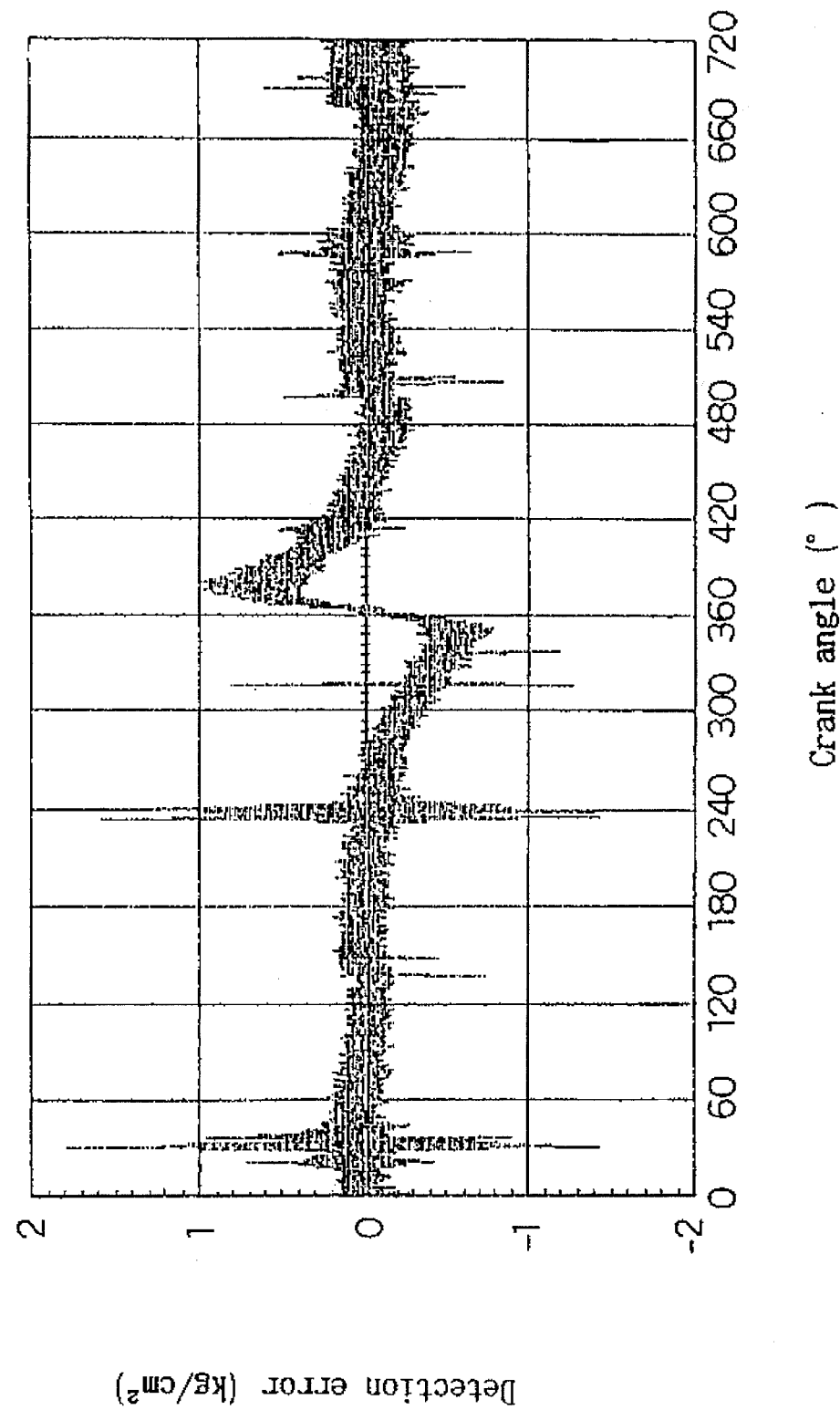
FIG. 10 is a diagram comparing the output of the sensor of the first embodiment and the output of a water-cooled reference sensor.
Figure 11:
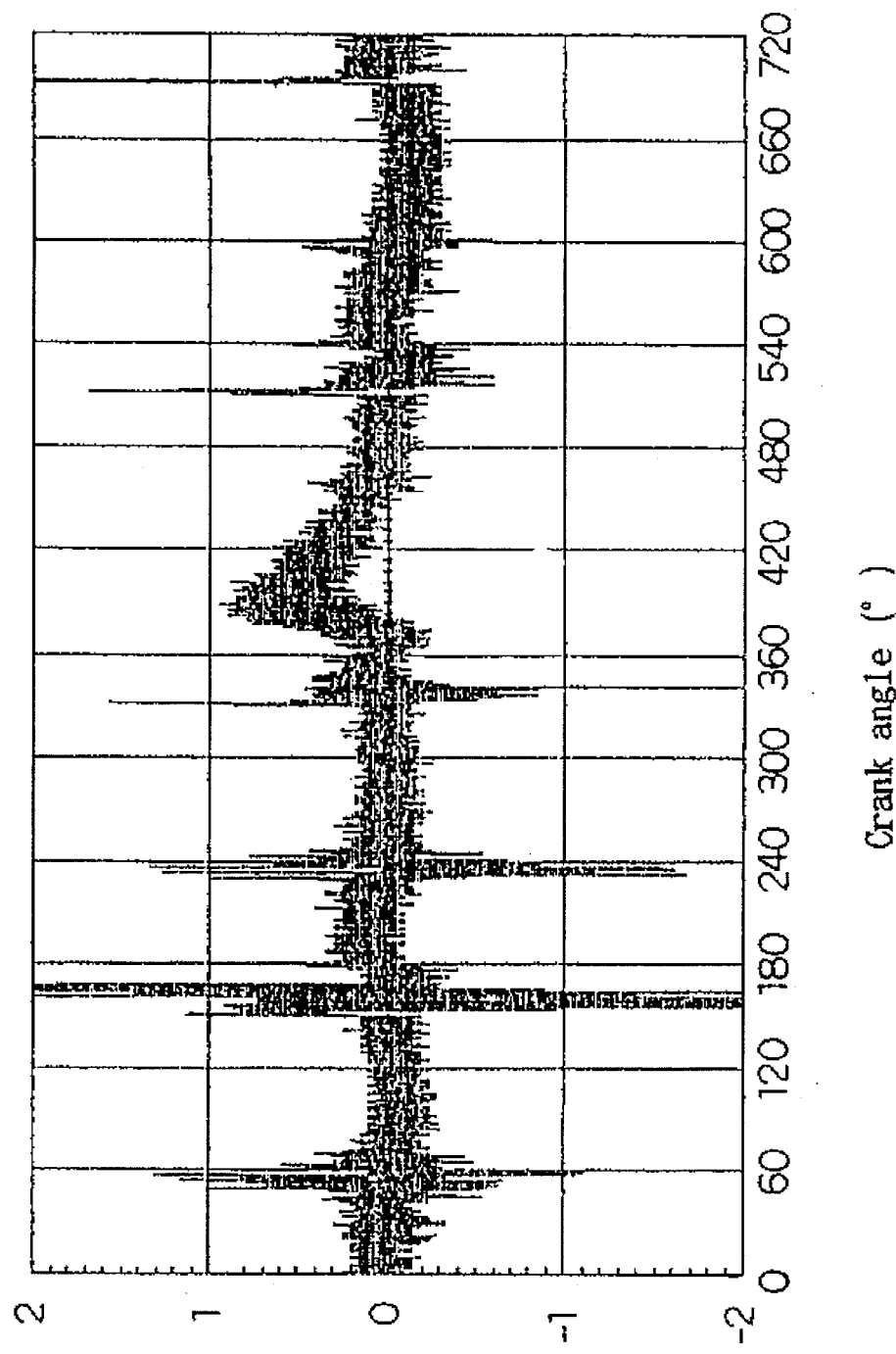
FIG. 11 is a diagram comparing the output of the sensor of the third embodiment and the output of the water-cooled reference sensor.

The pressure detection errors of the sensors of the embodiments are plotted in FIGS. 10 and 11 against the change in the crank angle of the engine.

FIG. 10 presents the comparison result between the sensor of the embodiment shown in FIG. 2 and the reference sensor, and FIG. 11 presents the comparison result between the sensor of the embodiment shown in FIG. 7 and the reference sensor. In each of these Figures, the ordinate indicates the pressure detection error in the units of $Kg/cm^2$ and the abscissa indicates the crank angle in the units of degrees.

Moreover, the crank angle of 0 degrees is set to the top dead center at the start of the suction stroke. The running conditions of the engine at the metering time are the number of revolutions of 3,000 R.P.M., the load torque of 6 Kg.m, and the air/fuel ratio of 14.6. In FIG. 10, the sensor output of the embodiment is lower by 0.5 $Kg/cm^2$ than that of the reference sensor at the crank angle of 350 degrees, but it is higher by about 0.7 $Kg/cm^2$ around the crank angle of 370 degrees. In the crank angle range of 350 to 370 degrees, the combustion chamber is at the highest temperature, and the tubular diaphragm is influenced by the heat so that such detection error occurs.

In FIG. 11, on the other hand, the sensor output of the embodiment is higher by about 0.5 $Kg/cm^2$ around the crank angle of 380 degrees, but no drop of the output around the crank angle of 350 degrees is found. As a result, the influence of the heat can be decreased to 1/2.4, if FIGS. 10 and 11 are compared, by keeping the tubular diaphragm away from the combustion chamber as in the embodiment of FIG. 7, so that a pressure sensor having less errors can be realized even in case the combustion is so unstable that the calories generated highly fluctuate.

Here will be described the third embodiment of the present invention with reference to FIGS. 8 and 9.

Figure 8:
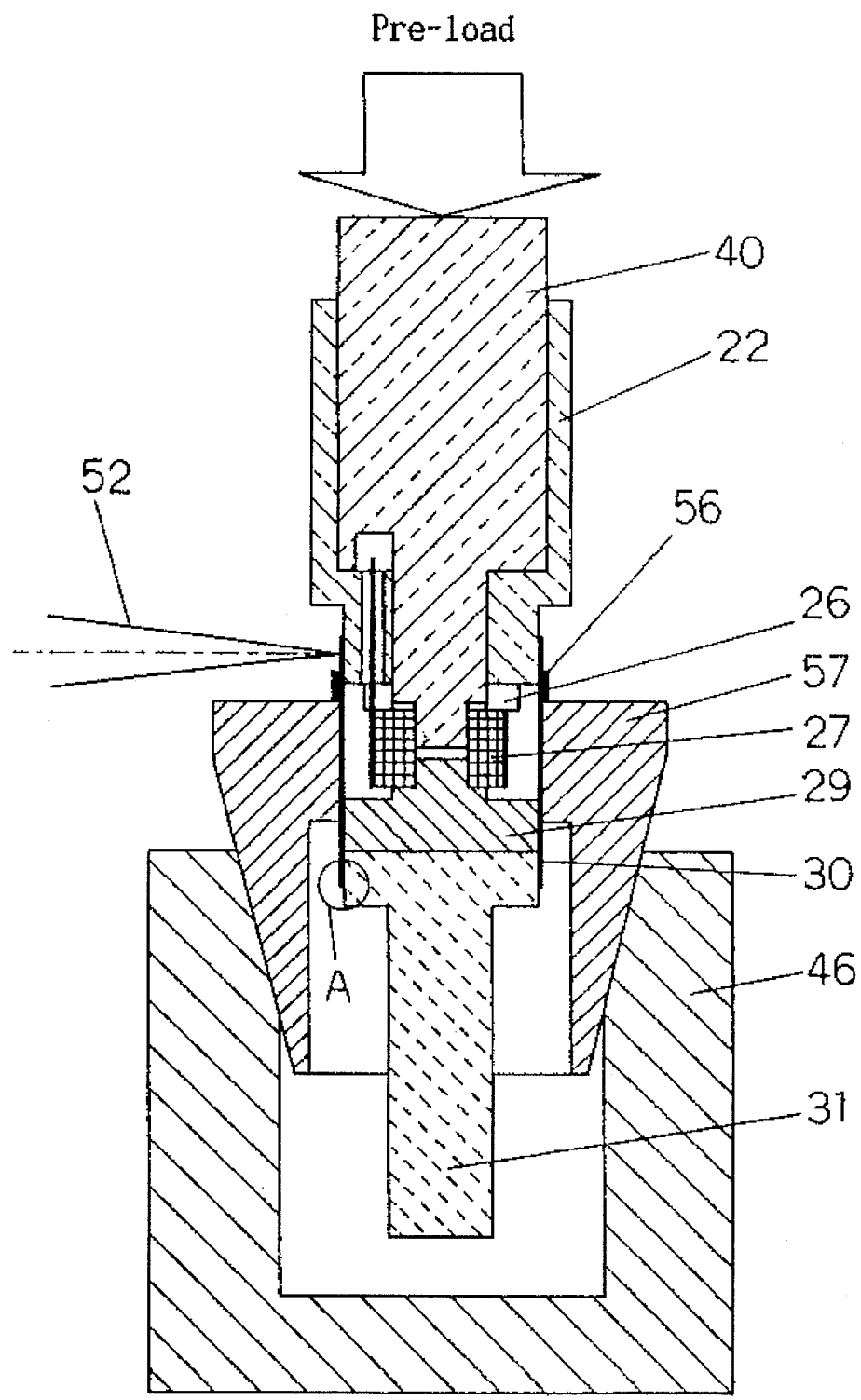
FIG. 8 is a detailed section showing a sensor portion of an apparatus for manufacturing the piezoelectric pressure sensor of the third embodiment of the present invention.
Figure 9:
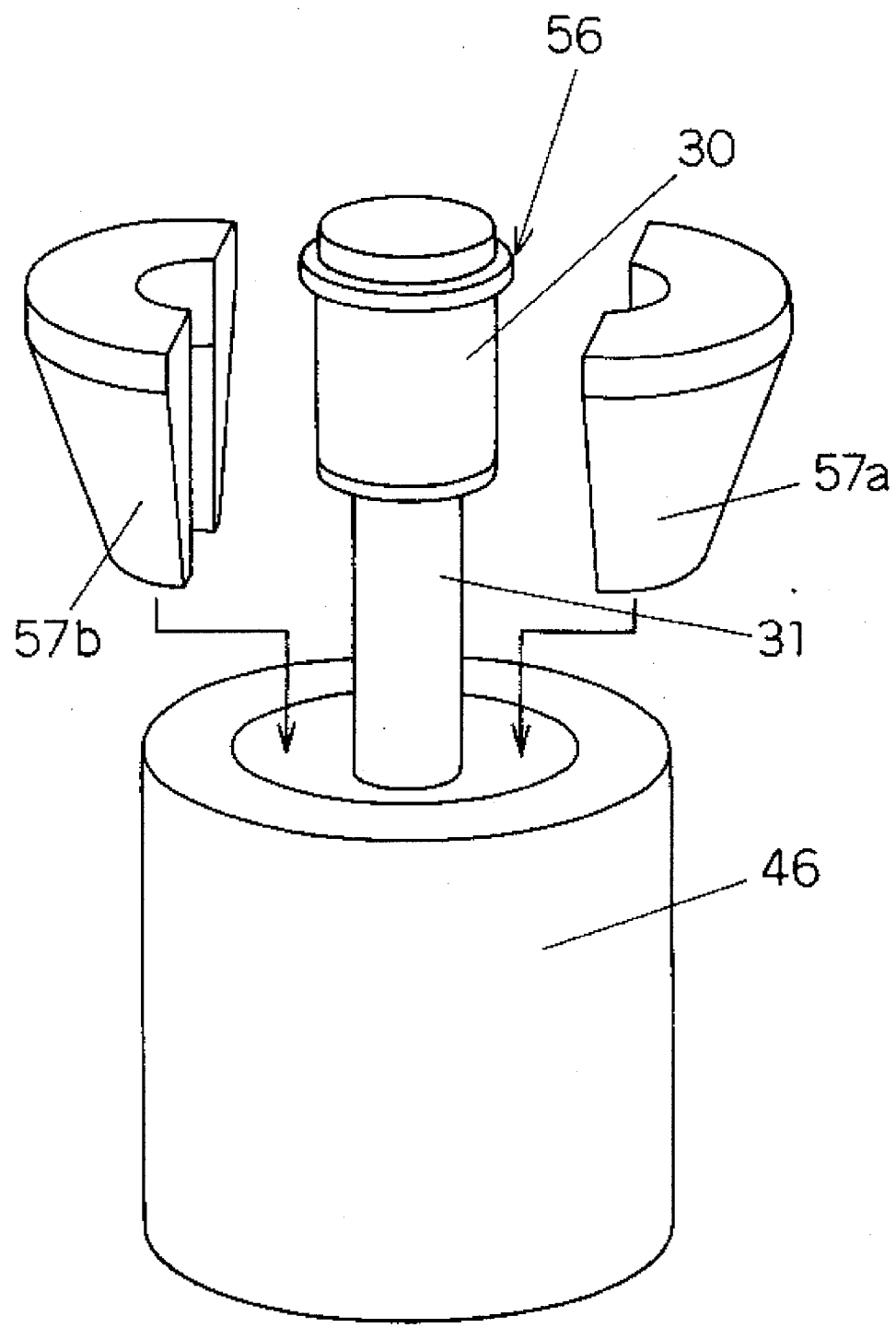
FIG. 9 is a perspective view for explaining a method of mounting the sensor in the manufacturing apparatus shown in FIG. 8.

FIG. 8 is a diagram for explaining a method of manufacturing the sensor shown in FIG. 7, and FIG. 9 shows the operation of mounting the sensor in a chuck. The base 31 and the tubular diaphragm 30 are welded in advance to each other, and the tubular diaphragm 30 is gripped by a chuck 57. The pressure transmission member 29, piezoelectric element 27, the insulating ring 26 and the lower portion of the inner casing 22 are inserted into the tubular diaphragm 30, and the pre-load is applied by the pressure head 40. The tubular diaphragm 30 has its upper portion formed with a bulging portion 56, which is supported by the upper face of the chuck 57 to bear the pre-load. This chuck 57 is supported by the taper face of the holder 46 so that the parts from the pressure head 40 to the holder 46 rotate altogether. During this rotation, the upper portion of the tubular diaphragm 30 and the inner casing 22 are welded with the laser beam 52. At the time of this assembling operation, the tubular diaphragm 30, the pressure transmission member 29, the piezoelectric element 27, the insulating ring 26 and the inner casing 22 have to be highly accurately positioned. For the assembly of the sensors of the embodiments shown in FIGS. 2 and 3, therefore, the inner casing is fitted and positioned in the inner face of the holder 46, as shown in FIG. 5.

Since, however, the sensor of the embodiment of FIG. 7 has the A portion of FIG. 8 welded, the surface roughness is so serious that the positioning by the fitting operation cannot be achieved.

As shown in FIG. 9, therefore, the chuck is divided into an a-chuck 57a and a b-chuck 57b, which are attached to cover the tubular diaphragm 30 radially. At this time, the welded portion of the base 31 and the tubular diaphragm 30 has such a structure as has a relief at the chuck side to exert no influence upon the positioning. When the pre-load is then applied to the piezoelectric element 27 by the pressure head 40, the chuck 57 is pushed onto the holder 46. Then, a force is established in the direction to close the a-chuck 57a and the b-chuck 57b by the effect of the taper face so that the tubular diaphragm 30 is clamped and firmly positioned by the chuck 57.

Since the chuck is thus divided to clamp the tubular diaphragm from the radially outer side, the regulation on the shape around the positioning portion of the tubular diaphragm can be eliminated to increase the degree of freedom of designing and lower the working cost for the parts.

What is claimed is:

1. A piezoelectric pressure sensor comprising:

an outer casing having a pressure receiving face at its leading end;

a tubular diaphragm for transforming a pressure received by said pressure receiving face into a strain;

a metal member contacting in a face-to-face relation with a back of said pressure receiving face and fixing said tubular diaphragm;

a pressure transmission member abutting against an opposite face of said metal member with respect to said pressure receiving face, for transmitting the pressure;

a piezoelectric element disposed at an opposite side of said pressure transmission member with respect to said metal member;

an inner casing fixed at one end of said tubular diaphragm and accommodating said pressure transmission member and said piezoelectric element therein; and an upper fixing member disposed at an opposite side of said piezoelectric element with respect to said pressure transmission member, wherein said upper fixing member is fixed in said inner casing while applying a pre-load to said piezoelectric element only in a direction substantially perpendicular to said pressure receiving face, wherein:

said metal member, said tubular diaphragm, said inner casing and said upper fixing member are accommodated in said outer casing, and the pressure applied to said pressure receiving face is transmitted to said piezoelectric element by said pressure transmission member.

2. A piezoelectric pressure sensor comprising:

a metal member for providing its leading end as a pressure receiving face;

a tubular diaphragm fixed at a side of said metal member with respect to said pressure receiving face, wherein said tubular diaphragm is provided for transforming a pressure applied to said metal member into a strain;

a pressure transmission member abutting against an opposite face of said metal member with respect to said pressure receiving face for transmitting the pressure;

a piezoelectric element disposed at an opposite side of said pressure transmission member with respect to said metal member;

a casing fixed at an opposite end of said tubular diaphragm with respect to said metal member, wherein said casing accommodates said pressure transmission member and said piezoelectric element therein; and an upper fixing member disposed at an opposite side of said piezoelectric element with respect to said pressure transmission member, wherein said upper fixing member is fixed in said casing while applying a pre-load to said piezoelectric element, wherein:

said upper fixing member has a mounting portion thereon for mounting said piezoelectric pressure sensor with another member, and said mounting portion is disposed at an opposite side of said upper fixing member with respect to a fixing point of said upper fixing member to said casing.

3. A piezoelectric pressure sensor comprising:

a metal member for providing its leading end as a pressure receiving face;

a tubular diaphragm fixed at a side of said metal member with respect to said pressure receiving face, wherein said tubular diaphragm is provided for transforming a pressure applied to said metal member into a strain;

a pressure transmission member abutting against an opposite face of said metal member with respect to said pressure receiving face for transmitting the pressure;

a piezoelectric element disposed at an opposite side of said pressure transmission member with respect to said metal member;

a first casing fixed at an opposite end of said tubular diaphragm with respect to said metal member, said first casing accommodating said pressure transmission member and said piezoelectric element therein;

an upper fixing member disposed at an opposite side of said piezoelectric element with respect to said pressure transmission member, said upper fixing member fixed in said casing while applying a pre-load to said piezoelectric element; and a second casing mounted on an opposite side of said upper fixing member with respect to said first casing, wherein:

said second casing has a mounting portion thereon for mounting said piezoelectric pressure sensor with another member, and said mounting portion is disposed at an opposite side of said second casing with respect to said upper fixing member.

4. A method of manufacturing a piezoelectric pressure sensor having a piezoelectric element for providing electricity according to a pressure applied to a pressure receiving face of a casing, a pressure transmission member for transmitting the pressure applied to said pressure receiving face to said piezoelectric element, and an upper fixing member disposed at opposite side of said piezoelectric element with respect to said pressure transmission member, the method comprising steps of:

applying a compressive load toward a position of said piezoelectric element to said upper fixing member by a pressure head;

simultaneously positioning said upper fixing member and said piezoelectric element by said pressure head; and simultaneously welding and fixing said casing and said upper fixing member.

5. A piezoelectric pressure sensor comprising:

an outer casing having a pressure receiving face at its leading end;

a tubular diaphragm for transforming a pressure received by said pressure receiving face into a strain;

a base contacting in a face-to-face relation with a back of said pressure receiving face, said base also connecting to said tubular diaphragm;

a pressure transmission member abutting against an opposite face of said base with respect to said pressure receiving face for transmitting the pressure; and a piezoelectric element disposed at an opposite side of said pressure transmission member with respect to said base, wherein:

said pressure transmission member and said piezoelectric element are fixed by a compressive load in an axial direction, and said piezoelectric element and said pressure transmission member are arranged inside of said tubular diaphragm.

6. A method of manufacturing a piezoelectric pressure sensor having a piezoelectric element for providing electricity according to a pressure applied to a pressure receiving face of a casing, a pressure transmission member for transmitting the pressure applied to said pressure receiving face to said piezoelectric element, a tubular diaphragm having said piezoelectric element and said pressure transmission member arranged therein, and an upper fixing member or an inner casing for fixing said piezoelectric element and said pressure transmission member, the method comprising steps of:

holding said tubular diaphragm in a chuck, wherein the chuck is divided into a plurality of segments along circumferential sections of said tubular diaphragm, in a manner such that at least a portion of an outer side face of said tubular diaphragm is covered with said chuck;

receiving a compressive load by said chuck, wherein the compressive load is applied to said piezoelectric element by a pressure head; and welding and fixing said tubular diaphragm to said upper fixing member or to a portion of said inner casing.

* * * * *